2,881,208

DI-TRICYCLODECANE (5,2,1,0$^{2,6}$)-8,8'-ETHER-4,4'-DICARBOXYLIC ACID

Karl Büchner, Oberhausen-Sterkrade, Josef Meis, Oberhausen-Osterfeld, and Otto Roelen, Oberhausen-Holten, Germany, assignors to Ruhrchemie Aktiengesellschaft, Oberhausen-Holten, Germany, a corporation of Germany No Drawing. Application August 15, 1956
Serial No. 604,079

Claims priority, application Germany August 18, 1955

1 Claim. (Cl. 260—514)

This invention relates to and has as its object the production of di-tricyclodecane (5,2,1,0$^{2,6}$)-8,8'-ether-4,4'-dicarboxylic acid, which has been found to constitute a valuable dicarboxylic acid which is particularly well suited for the production of monoesters and polyesters to be used as bases for lacquers, plastics, placticizers, lubricants and for similar uses.

It is known to produce 8-hydroxy-tricyclodecene-4(5,2,1,0$^{2,6}$) from dicyclopentadiene by the addition of water in the presence of sulfuric acid. This reaction is accompanied to a minor degree by a splitting off of water between two molecules of the secondary alcohol formed. The splitting off of water results in the formation of ethers and other higher boiling products. When recovering the secondary alcohol by distillation, resinous masses are obtained as the distillation residues, which have hithertofore been considered worthless by-products.

The side reaction may, of course, be made a main chemical reaction by splitting off water from 8-hydroxy-tricyclodecene-4(5,2,1,0$^{2,6}$) with the formation of ether or by condensing it with dicyclopentadiene. The reaction may be represented as follows:

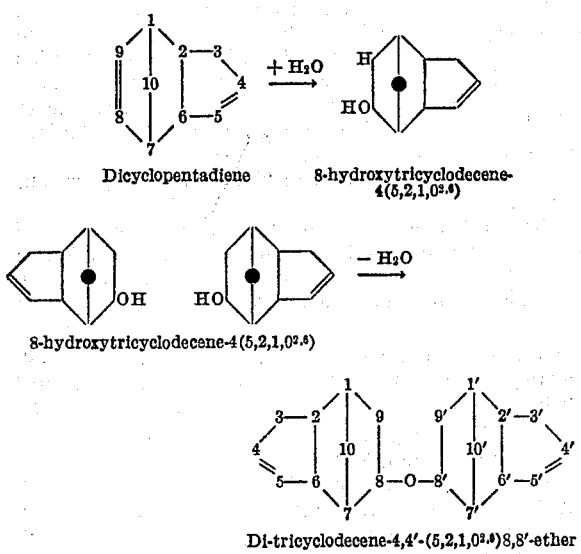

It has now been found in accordance with the invention that a valuable high-molecular weight dicarboxylic acid may be produced from this ether by-product, which has hithertofore been considered worthless.

In accordance with the invention, the di-tricyclodecene-4,4'(5,2,1,0$^{2,6}$)8,8'-ether is subjected to a catalytic dialdehyde synthesis with water gas, i.e., an oxo-synthesis, so that one methylal group is added to each of the double bonds at the 4-position in accordance with the following reaction:

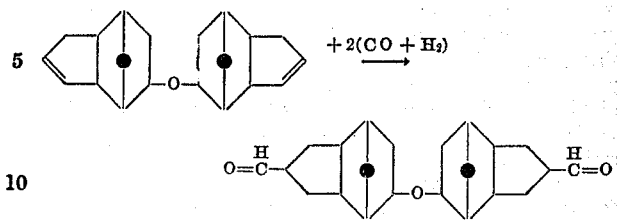

Di-tricyclodecane 5,2,1,0$^{2,6}$ 8,8' ether-4,4' di-methylal

The ether dimethylal obtained which is believed to constitute a novel compound is subsequently subjected to a catalytic treatment with hydrogen, thereby converting it into the corresponding dialcohol and the latter is subsequently subjected to a treatment with molten alkali and converted into the corresponding dicarboxylic acid by treatment with any organic or inorganic acid at a pH value below that of the ether dicarboxylic acid.

The conversion proceeds in accordance with the following reaction scheme:

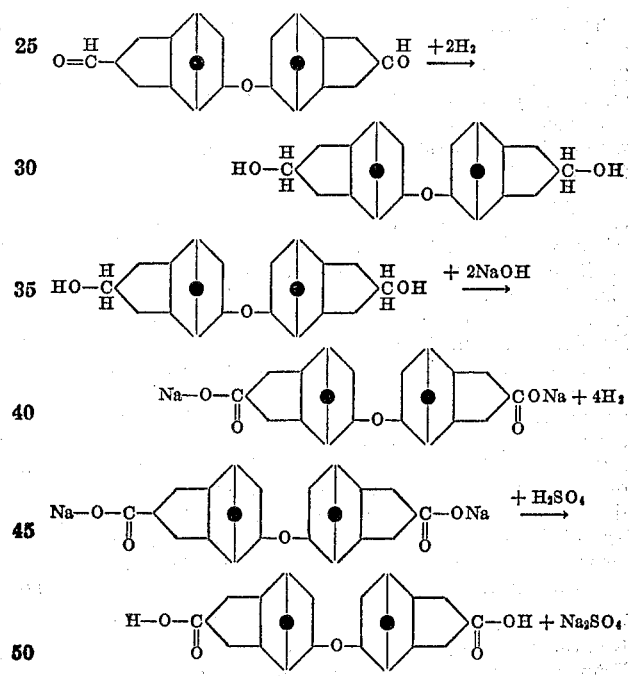

The novel ether dicarboxylic acid formed may be designated di-tricyclodecane (5,2,1,0$^{2,6}$)-8,8' ether-4,4'-dicarboxylic acid and is first obtained in crystalline form containing water of crystallization. At a temperature of about 70° C. and under vacuum as, for example, a pressure of 20 mm. Hg as produced by a water jet pump, the acid loses its water of crystallization and becomes amorphous. The acid is very temperature-resistant and will be resistant to temperatures of as high as about 300° C. in the absence of oxygen. The acid has the following characteristics:

Melting point _____ 115–118° C.
Neutralization number _____ 298 (corrected 299).
Saponification number _____ 298.5.
C _____ 70.26%.
H _____ 8.13%.
Molecular weight of the di-n-butylester _____ 477 (corrected 287).

Instead of converting the dialdehyde into the corresponding dimethylol compound by hydrogenation, it is possible to directly treat the raw dialdehyde with the molten alkali. In this case, however, it is difficult to separate the dicarboxylic acid from the mono-derivatives and thick oils, which are also present in the raw aldehyde. If, however, the dimethylol compound is treated with molten alkali, it can first be freed from undesirable by-products by fractional distillation, and can thus be further processed in pure form. For the same reason, the production of dicarboxylic acid by the oxidation of the dialdehyde with an oxidizing agent, as, for example, with nitric acid or atmospheric oxygen, is not completely satisfactory.

In accordance with the preferred mode of operation for the production of the dicarboxylic acid, the residue obtained in the production of 8-hydroxy tricyclodecene is distilled, so that roughly 76% of the quantity charged is distilled off with distillation being effected at a pressure of about 2 mm. of mercury at a temperature up to 196° C. with no fractionation. From this known operational step a yellow oil having the following characteristics is obtained:

Iodine number by Kaufmann _____ 168
Neutralization number _____ 0.1
Ester number _____ 1.2
Hydroxyl number _____ 67

This oil may be fractionated, which results in the separation of 62.2% by weight of di-tricyclodecene-4,4'(5,2,1,0$^{2,6}$)8,8'-ether. The ether is then subjected to a dialdehyde synthesis, as, for example, by diluting the same with equal parts of benzene and contacting the mixture with carbon monoxide and hydrogen at a temperature between about 135 and 150° C. and at a pressure of about 150–300 atmospheres in the presence of a catalyst which supplies cobalt carbonyl hydrogen for a period of time of between about 2 and 3 hours. This results in the addition of methylal groups in the 4,4'-position. The dialdehyde is then subjected to a catalytic hydrogenation which converts the aldehyde groups into the corresponding alcohols. The dimethylol separates from the benzene solution as a lower, heavier layer after the addition of aliphatic saturated hydrocarbons, as, for example, hexane or heptane. Upon separation of this lower, heavier layer, the same may be purified with further amounts of heptane resulting in about 90% pure raw diol. To obtain the diol in pure form, the same is subjected to a short distillation under vacuum (0.5 mm. Hg) at 205–214° C. The distillate obtained is a solid, resinous, readily brittle, clear and transparent substance, having the following characteristics:

Iodine number _____ 0.
Neutralization number __ 0.3.
Ester number _____ 2.0.
Hydroxyl number _____ 313 (corrected 323 for di-tricyclodecane - (5,2,1,0$^{2,6}$) - 4,4'-dimethylol-8,8'-ether).
Iodine color number ____ 0–1.
Melting point _____ 50/51° C.

This intermediate product is novel and has not yet been described in the literature. The yield of the diol is 70–85% based on the di-tricyclodecene-4,4'(5,2,1,0$^{2,6}$)8,8'-ether.

The treatment of the diol with molten alkali is preferably effected at a low temperature. The splitting off of hydrogen commences at about 210° C. and practically terminates at 250° C., so that the diol charge is converted into the corresponding dicarboxylic acid salt. To convert the last residues of the diol the temperature of the melting bath may be increased to about 300° C. without deteriorating the compound.

It is then preferable to cool the compound to about 150° C. and to inject about 150% of water-based on the quantity of diol charged into the hot melt to thereby convert the same into a paste which can be easily handled.

The treatment with molten alkali may also be effected in the presence of a neutral hydrocarbon, as, for example, octane or its homologues.

After being removed from the melting operation, the salt paste is diluted with water to four to five times its volume. To obtain a pure white ether dicarboxylic acid, the excess alkali is neutralized to a pH value of 8, and then the salt paste is hydrogenated at 210° C., using a known hydrogenation catalyst, preferably a nickel magnesia kieselguhr catalyst (100:10:50). Thereby the brown, aqueous salt solution is brought to an iodine color number of 0. By acidifying the same with, for example, hydrochloric acid or sulfuric acid to pH 5.9, small amounts of dicarboxylic acid ether compounds and monocarboxylic acid ether compounds containing impurities, precipitate from the purified solution. Following this, the main precipitation of the crystalline clear water containing di-tricyclodecane (5,2,1,0$^{2,6}$)-8,8'-ether-4,4' dicarboxylic acid is effected with the further addition of acid while stirring.

Drying in a desiccator at 70° C. under a vacuum of 20 mm. mercury results in the formation of the anhydrous, amorphous ether dicarboxylic acid having the characteristics given above.

The ether dicarboxylic acid ($C_{22}H_{30}O_5$) is useful in all reactions which require the presence of carboxyl groups. As mentioned, the acid is particularly suitable for the production of monoesters and polyesters as bases for lacquers, plastics, plasticizers, lubricants, and for similar uses. The ether dicarboxylic acid is relatively insoluble in ethers, but soluble in cold benzene hydrocarbons, ketones, alcohols, and chlorinated hydrocarbons. The dicarboxylic acid is sparingly soluble in acetic acid when cold and readily soluble when hot.

The following examples are given by way of illustration and not limitation:

*Example 1*

1790 grams of a highly viscous, dark brown residue was filled into a 2 liter flask. This residue had been obtained in amount of about 10% by processing by distillation, 8-hydroxy-tricyclodecene-4(5,2,1,0$^{2,6}$) obtained by the addition of water to dicyclopentadiene. The 2 liter flask was provided with an empty tube of 30 cm. length serving as a column. The distillation was effected up to a vacuum of 0.5 mm. Hg with total condensation of the distillate. The maximum temperature was 195° C. as measured at the transition point. A distillate of yellow color and lubricating oil consistency was obtained in amount of 1360 grams (76%). The bottoms product remaining in the flask was a solid, dark brown, resinous residue.

The distillate in amount of 1290 grams was fractionated in a packed column of 30 cm. in length with the addition of about 1% of magnesia. The products obtained with separation of the intermediate fractions were as follows:

Grams
8-hydroxytricyclodecene - 4 _____ 189
di-Tricyclodecene-4,4'(5,2,1,0$^{2,6}$)8,8' ether _____ 1032
Higher polymers _____ 50

The boiling range of the ether was between 165 and 170° C. (at 0.7 mm. Hg).

646 grams (600 cc.) of this di-tricyclodecene-4,4'(5,2,1,0$^{2,6}$)-8,8' ether were diluted with 600 cc. of toluene. The mixture, together with 600 cc. of aqueous cobalt sulfate solution (15 grams of Co/liter), 25 grams of iron powder and 2 grams of hydroquinone, was filled into an autoclave with stirrer having a capacity of 3.6 liters. After displacement of the air from the autoclave, the same was filled with water gas from a cylinder to a pressure of 200 atmospheres. The autoclave was then heated to 153° C. while stirring. The absorption of gas started at 140° C. and was terminated after 2 hours. About 9 mols of CO+H$_2$ were absorbed with the amount charged of di-tricyclodecene-4,4'(5,2,1,0$^{2,6}$)-8,8' ether being 2.04 mols.

Upon termination of the gas absorption, the autoclave was cooled, the product was removed and separated from the aqueous catalyst solution by decantation. The dilute raw dialdehyde ether had the following characteristics:

Iodine number _____ 5
Carbonyl number _____ 153
Hydroxyl number _____ 28

This raw dialdehyde ether was reduced with hydrogen under pressure at 158° C. with the addition of 10% by volume of Fischer-Tropsch catalyst. After cooling and removing the catalyst by filtration, the raw dimethylol ether was shaken out two times using 300 cc. of heptane for each extraction, and the lower heavy layer was separated. The last residues of heptane were removed by distillation in a boiling water bath at about 20 mm. Hg. The residue from this distillation comprised 600 grams of raw diol ether having the following characteristics:

Iodine number _____ 2
Neutralization number _____ 0.4
Ester number _____ 5.3
Hydroxyl number _____ 281
Carbonyl number _____ 7

300 grams of this raw diol ether, together with 154 grams of KOH, were filled into a copper-lined autoclave with stirrer having a capacity of 2.8 liters. The autoclave was heated to 240° C. The evolution of hydrogen started already at 200° C. and was practically terminated after about 30 minutes at a final temperature of 250° C. A total of 3.4 mols of hydrogen was obtained. After cooling of the melt to 150° C., 500 cc. of water were forced into the autoclave while stirring. The aqueous salt paste was made up with water to 2.5 liters and brought to pH 7.0 by adding dilute hydrochloric acid. This resulted in a precipitate in amount of 60 grams, consisting of unsaponifiable matter and mono-ether-carboxylic acid. The neutralized solution was shaken out two times with 150 cc. of benzene to remove any unsaponifiable components still present. Further addition of dilute hydrochloric acid to pH 5.9 resulted in a second precipitate, the amount of which was likewise 60 grams. The characteristics of the precipitated dried substances were as follows:

|  | 1st Precipitate | 2nd Precipitate |
|---|---|---|
| Iodine number | 22 | 2 |
| Neutralization number | 79 | 226 |
| Ester number | 0 | 0 |
| Hydroxyl number | 8 | 1 |

The prepurified ether-dicarboxylic acid salt solution was then completely precipitated by adding further amounts of hydrochloric acid until the pH value was 2.0. This resulted in 310 grams of crystalline, moist ether dicarboxylic acid which became amorphous upon drying at 70° C. under vacuum. The amount obtained was 170 grams with the following characteristics:

Melting point _____ 105–110° C.
Neutralization number _____ 286 (corrected, 299).
Ester number _____ 0.
Iodine number _____ 1.
Hydroxyl number _____ 7.

*Example 2*

2 kilograms of dicyclopentadiene and 3 kilograms of 25% sulfuric acid, in a 6 liter flask, were refluxed while stirring. Following this, sufficient water was distilled off that the concentration of the sulfuric acid increased to about 37%. The refluxing was then continued for two hours. The product obtained after separation of the sulfuric acid and washing with sodium hydroxide solution and water had the following characteristics:

Hydroxyl number _____ 214
Iodine number _____ 148

Fractionation of this product resulted in 30% of di-tricyclodecene-4,4'-(5,2,1,0$^{2,6}$)-8,8'-ether (650 grams) in addition to 55% of non-etherified 8-hydroxytricyclodecene-4.

538 grams of this ether were diluted with the same volume of toluene. After the addition of 10% by volume of Fischer-Tropsch catalyst and 2 grams of hydroquinone, it was subjected to the Oxo-synthesis in the manner described in Example 1 except for the temperature which was only 135° C. This was followed by the hydration which was effected for 2 hours at 210° C. with the addition of 10% by volume of water to precipitate dissolved metals and to cleave the acetals. The hydrated product had the following characteristics:

Iodine number _____ 3
Neutralization number _____ 1
Ester number _____ 14.5
Hydroxyl number _____ 24
Carbonyl number _____ 132

The hydrogenation was effected as described in Example 1. As in Example 1, the hydrogenated product was extracted two times by shaking, using 300 cc. of heptane for each extraction. The residue from the evaporation of the heptane contained 25 grams of a product which was similar to neutral oil and had the following characteristics:

Iodine number _____ 24
Neutralization number _____ 1
Ester number _____ 12
Hydroxyl number _____ 90
Carbonyl number _____ 27

The distillation of the di-tricyclodecane(5,2,1,0$^{2,6}$)-8,8'-ether-4,4'-dimethylol was effected at 0.5 mm. Hg in a short-run distilling apparatus. At 205–215° C., 400 grams of a fraction with the following characteristics was obtained:

Hydroxyl number _____ 314 (corrected 323).
Neutralization number _____ 0.1.
Ester number _____ 1.2.
Iodine number _____ 1.

The first runnings amounted to 12 grams and the solid residue to 38 grams. 350 grams of the distillate were mixed with 350 cc. of cetane and 135 grams of caustic potash and melted in the manner described in Example 1. Towards the end of the splitting-off of hydrogen, a brief heating to 300° C. was effected.

The dilution with water and the dissolution of the dicarboxylic acid salts obtained was effected in the manner described in Example 1. After neutralization of the solution with sulfuric acid to pH 7, 270 cc. of this yellowish-brown solution, in an autoclave, were treated for 2 hours with hydrogen at 210° C. and 100 atmospheres, using a nickel-magnesia-kieselguhr catalyst (100 : 10 : 50). Separation of the catalyst by filtration resulted in a water-white filtrate with an iodine color number of 0, which was precipitated at pH 5.9, and, after separation of the precipitated substances, subjected to final precipitation in the manner described in Example 1, until the pH value was 2. After drying under vacuum, there were obtained 252 grams of di-tricyclodecane(5,2,1,0$^{2,6}$)-8,8' ether-4,4'-dicarboxylic acid having the following characteristics:

Neutralization number _____ 290 (corrected 299).
Iodine number _____ 0.
Ester number _____ 0.
Melting point _____ 115° C.

Example 3

A suitable ester-lub-oil (III) for vacuum pumps and compressors is obtained from di-tricyclodecane(5,2,1,0$^{2,6}$)-8,8'-ether-4,4'-dicarboxylic acid (I) and 3,5,5-trimethylhexanol-1 (II) in the following procedure:

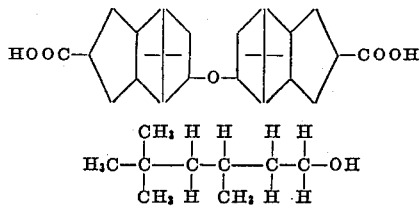

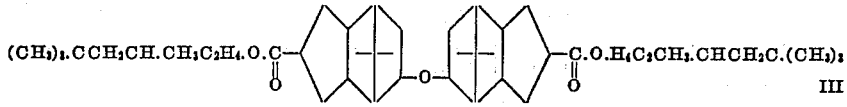

374 g. (I) (1 mol)+630 g. (II) (2.19 mol) were refluxed with 1 g. p-toluenesulfonic acid and 300 ml. toluene in a 2 litre round flask with a water precipitator attached. After 12 hours a test showed an acid number NZ=60 and a hydroxyl number OHZ=68. Following this procedure 60 g. (II) and 2 g. borontrifluoride were added. After another half hour of refluxing the water precipitation was finished. The ester (III) was then scrubbed with 1% potassium hydroxide up to an acid number of 0.07 and was obtained at 0.03 torr in a short-way-distillating-(molecular)-apparatus at 193–220° C. Characteristics of the ester lub oil obtained were:

| | |
|---|---|
| Density D$_{20}$ | 0.990 |
| Refractive index $n_D^{20}$ | 1.4849 |
| Pour point Stp °C | −23 |
| Flash point Flp °C | 230 |
| Viscosity V$_{50}$ cs | 80 |
| Viscosity V$_{80}$ cs | 22 |

The ester (III) is also very suitable as a blending component with other ester oils. With a tricyclodecane(5,2,1,0$^{2,6}$)methylol-4-valeric acid ester C$_{16}$H$_{26}$O$_2$ (structure IV):

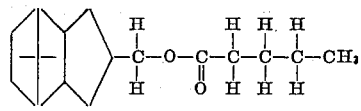

showing only a very low viscosity of V$_{50}$=7.4 cs., a mixture of 30 parts by weight (III) and 70 parts by weight (IV) has the following characteristics:

| | |
|---|---|
| Density D$_{20}$ | 1.024. |
| Viscosity V$_{50}$ | 15.7 cs. (calc. 15.5). |
| Vapor point VP | 1.88. |
| Flash point Flp | 165° C. |
| Pour point Stp | −50° C. (calc. −50.5). |

The viscosity and the solidification point of the mixture has been calculated as an arithmetic median. Ester (III) may therefore be used as a high viscous blending component dealing with mixed ester oils.

Example 4

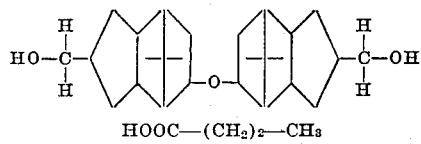

HOOC—(CH$_2$)$_2$—CH$_3$   VI

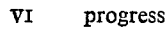

711 g. (V) (about 85%), 395 g. (VI) (110% of the amount calculated) and 3.5 g. p-toluenesulfonic acid such as used in Example 3 were refluxed for two hours. After this time the water formation (splitting off) is finished and the hydroxyl number of the mixture is OH=1 and the acid number is NZ=37.8. After scrubbing, drying and distilling carried out as in Example 3, 790 g. (calculated 832 g.) ester (VII) are obtained having the following characteristics:

| | |
|---|---|
| Density D$_{20}$ | 1.077. |
| Refractive index $n_D^{20}$ | 1.5017. |
| Boiling range | 238–245° C. (0.02 torr). |
| Flash point Flp | 277° C. |
| Pour point Stp | −5° C. |
| Viscosity V$_{50}$ | 215 cs.~28.3° E. |
| Viscosity V$_{80}$ | 46.4 cs.~6.16° E. |
| Molecular weight | 477 (calculated 486). |

Example 5

The preparation of a polyester from di-tricyclodecane-(5,2,1,0$^{2,6}$)-8,8'-ether-4,4'-dicarboxylic acid was carried out as follows.

In a 100 round flask with a nitrogen inlet joint and a short nitrogen and water outlet joint, including a joint for thermometer and an agitator ground in, heated externally by a semi circular shaped hood including an adjusting device, using 25 g. di-tricyclodecane(5,2,1,0$^{2,6}$)-8,8'-ether-4,4'-dicarboxylic acid (moist) (acid number, NZ=160), 4.1 g. glycol (excess which partly distills over), 0.1 g. oxalic acid, heating this mixture for one hour under agitation at 100° C. and after 12 hours at 150° C. and additional 6 hours at 200–210° C., a clear polyester was obtained. The polyester product could be broken up into a white powder and had the characteristics: acid number NZ 7.3; hydroxyl number OHZ 7; melting point 124–130° C.

The product ground in the mortar was subjected to a thermal post-treatment at 270° C. and 1 mm. mercury level under nitrogen protection. For heat transfer a phthalate bath was used. The polyester thereby obtained (melting point 124–135° C.) had a hard shining surface and was especially suited for use as a lacquer component. Its molecular weight as calculated from the final figures was about 8000.

Example 6

In the same apparatus as shown in Example 5, 20 g. di-tricyclodecane(5,2,1,0$^{2,6}$) - 8,8'-ether - 4,4 - dimethylol (0.057 mol), 2.25 g. adipic acid (0.015 mol), 5.17 maleic acid anhydride (0.015 mol) were first agitated for one hour at 100° C. under nitrogen protection, then for 18 hours under nitrogen protection at 150° C. This resulted in heavy condensation and especially polymerisation. The final product was soluble only in the amount of one part in solvents such as benzyl-benzene-chloride and diphenylether. Essentially a swelling occured. On heating to temperatures >140° C. only slight sintering occured, whereas the main part did not melt until 320° C. The polyester was of a slightly yellowish colour, very hard but still somewhat brittle since the esterification had already progressed too far.

For the copolymerisation with styrol there was charged:

1 g. of the aforementioned polyester (ground)
1 g. styrol fractionated
0.02 g. hardening paste (benzoylperoxide-phthalate)
0.1 g. quinone.

After 5 hours of heating in a phthalate bath to 100–120° C. under nitrogen protection the styrol had reacted and was copolymerised. The polyester treated in this way had a yellowish colour, was hard and had lost its brittleness.

We claim:

Di-tricyclodecane(5,2,1,0$^{2,6}$) - 8,8' - ether - 4,4' - dicarboxylic acid having the following formula

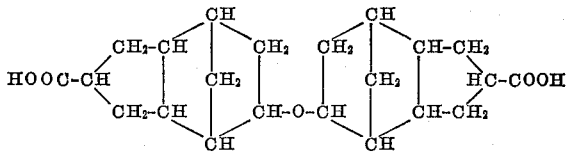

References Cited in the file of this patent
UNITED STATES PATENTS

| | | |
|---|---|---|
| 1,968,300 | Kyrides | July 31, 1934 |
| 2,610,211 | Darragh et al. | Sept. 9, 1952 |
| 2,749,328 | Cline | June 5, 1956 |

UNITED STATES PATENT OFFICE
Certificate of Correction

April 7, 1959

Patent No. 2,881,208       Karl Büchner et al.

It is hereby certified that error appears in the printed specification of the above numbered patent requiring correction and that the said Letters Patent should read as corrected below.

Column 2, lines 24 to 27, the reaction scheme should appear as shown below instead of as in the patent— column 7, line 61, after "*Example 4*", insert the following paragraph:

A high viscous distillable water clear ester (VII) as softener for polyesters, mixed polymerisates and cellulose esters is obtained by esterification of the di-tricyclodecane $(5,2,1,0^{2,6})$-8,8'-ether-4,4'-dimethylol (V) with butyric acid (VI):

Signed and sealed this 15th day of September 1959.

[SEAL]

Attest:
KARL H. AXLINE,
*Attesting Officer.*

ROBERT C. WATSON,
*Commissioner of Patents.*